US010242190B2

(12) United States Patent
Davidov et al.

(10) Patent No.: US 10,242,190 B2
(45) Date of Patent: *Mar. 26, 2019

(54) SYSTEM AND METHOD FOR DETECTION OF MALICIOUS CODE BY ITERATIVE EMULATION OF MICROCODE

(71) Applicant: LEVIATHAN SECURITY GROUP, INC., Seattle, WA (US)

(72) Inventors: Mikhail Davidov, Seattle, WA (US); Patrick Stach, The Woodlands, TX (US)

(73) Assignee: LEVIATHAN SECURITY GROUP, INC., Seattle, WA (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/807,330

(22) Filed: Jul. 23, 2015

(65) Prior Publication Data
US 2016/0196425 A1    Jul. 7, 2016

Related U.S. Application Data

(60) Provisional application No. 62/028,173, filed on Jul. 23, 2014.

(51) Int. Cl.
*G06F 21/56* (2013.01)
(52) U.S. Cl.
CPC ................. *G06F 21/566* (2013.01)
(58) Field of Classification Search
CPC ....................................................... G06F 21/566
USPC ........................................................... 726/23
See application file for complete search history.

(56) References Cited

U.S. PATENT DOCUMENTS

2016/0196368 A1* 7/2016 Momot ............... G06F 17/5009
703/22

OTHER PUBLICATIONS

GitHub, "Libemu Shellcode Emulation", Oct. 8, 2015, 9 pages.
"Shellcode Detection and Emulation with Libemu", Posted in General Security on Jul. 29, 2014, 25 pages.

* cited by examiner

*Primary Examiner* — Kambiz Zand
*Assistant Examiner* — Aubrey H Wyszynski
(74) *Attorney, Agent, or Firm* — Vernon W. Francissen

(57) ABSTRACT

Examples of systems, methods and media are shown for iteratively emulating potentially malicious code involving, for each offset of a microarchitecture for the code, emulating a first ring of an operating system, executing a segment of code in the emulated first ring, checking the behavior of the executing code for suspect behavior, and identifying the executing code as malicious code if suspect behavior is detected. Some examples include emulating a second ring of the operating system having a higher level of privilege than the first ring, such that the second ring emulation returns results to the executing code segment, but does not actually perform the functionality in a host platform.

20 Claims, 7 Drawing Sheets

SYSTEM AND METHOD FOR DETECTION OF MALICIOUS CODE BY ITERATIVE EMULATION OF MICROCODE

CROSS REFERENCE TO RELATED APPLICATIONS

This application claims the benefit of U.S. Provisional Patent Appl. No. 62/028,173 for "System and Method for Detection of Malicious Code by Iterative Emulation of Microcode" filed Jul. 23, 2014, herein incorporated by reference in its entirety for all purposes.

GOVERNMENT LICENSE RIGHTS

This invention was made with government support under FA8750-12-C-0161 awarded by the United States Air Force. The government has certain rights in the invention.

BACKGROUND

Computer networks and the devices and services that reside on them are often the subject of attacks by parties that are attempting to improperly access information and resources or to introduce malicious code to the networks. One type of attack is based on branch oriented programming, such as jump-oriented programming (JOP) or return-oriented programming (ROP), wherein attackers link together short runs of code already present in a program's address space in order to gain control of programs without relying on code injection. In any case, the injection of code sequences or ROP chains is generally necessary to achieve code execution, and so the presence of apparent exploit-like sequences in a snapshot of process memory may contain evidence of an attempt to exploit a vulnerability in the software.

SUMMARY

According to one aspect of the present invention, an example of a method for iteratively emulating potentially malicious code, the method comprising the steps of, for each offset in a memory image, emulating at least one function of a microprocessor executing an instruction stream starting at that offset using a predetermined set of state, either as privileged or unprivileged code should such a concept be applicable to the microarchitecture being emulated, checking the behavior of the executing code for suspect behavior, and identifying the executing code as malicious code if suspect behavior is detected.

In one refinement of the method, the method includes the step of emulating a second ring of the operating system, the second ring having a higher level of privilege than the first ring, such that the second ring emulation returns results to the executing code segment, but does not actually perform the functionality in a host platform. In a further refinement, emulating a second ring of the operating system is done by emulating the code payload in a virtual machine and emulating operating system calls and interrupts in a separate layer that does not perform the operating system calls and interrupts, but returns an expected return value to the code payload in order to facilitate continued execution of the code payload.

In another refinement of the method, the step of executing a segment of code in the emulated first shell further includes co-locating related segments of likely exploit payload code using a sliding window applied to using a sliding window applied to emulated code. In a further refinement, searching starting offsets using a sliding window to produce a profile of suspicious behavior in order to demonstrate an attacker-desirable property of exploit code whereby it can be executed from a large number of starting offsets. In still another refinement of the method, the step of checking the behavior of the executing code payload for suspect behavior further includes determining the suspect behavior one or more of dynamically, parametrically, and statically. In yet another refinement of the method, the suspect behavior includes one or more of invocations of certain operating system or platform behavior, execution of predetermined instructions, execution of predetermined sequences of instructions, accesses to predetermined memory addresses, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

In another refinement of the method, rather than applying the steps to each offset in a memory image, the method includes a further and prior step which limits the offsets selected for emulation, in that it identifies offsets which are substantially similar to other offsets in that they begin with identical sequences of at least some configurable length, or have identical context, and choosing only one of those to which the process of emulation is applied. In yet another refinement of the method, the step of identifying offsets which are substantially similar to other offsets involves applying one or more hashing algorithms to the byte stream at each offset for the configurable length, and checking only those starting offsets corresponding to hashes which are not unique within the scope of the memory image being processed for duplication against others corresponding to the same hashes (i.e. a Bloom filter heuristic is applied). In still another refinement of the method, the iteration over offsets into the memory image is further limited by excluding those offsets the stream beginning at which immediately begins with one of a set of sequences computed in advance for the microarchitecture and context under emulation, which may correspond to instructions which are invalid or instructions which are invalid in context (e.g. literally invalid instructions, privileged instructions in an unprivileged context, or uncommitted ranges). In still another refinement of the method, the iteration over offsets into the memory image is further limited by excluding those offsets from which execution is expected to begin, e.g. in the case of literal emulation, program entry points and exports and the start of basic blocks given a disassembly of the program resident in the memory image, and in the case of emulation of suspected ROP chains, the beginning of the actual stack. In yet another refinement of the method, the process of limiting the offsets to be emulated never removes (i.e. always indicates emulation of) certain memory addresses present in a list of addresses or ranges of addresses found to be commonly used by attackers or otherwise of interest, provided that data sufficient to support emulation starting at such offsets in fact exists (e.g. they are committed ranges). In yet another refinement of the method, the process of limiting the set of starting offsets further includes the step of removing those offsets which, starting with instructions which have no effect on state other than updating the instruction pointer (i.e. literal and semantic NOPs) or the effect on system state other than the instruction pointer of which is rendered moot by the operation of a subsequent instruction (e.g. moving an immediate into a register, followed immediately by moving another immediate into the same register), indicate substantially identical instruction streams to those indicated by an immediately subsequent offset.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
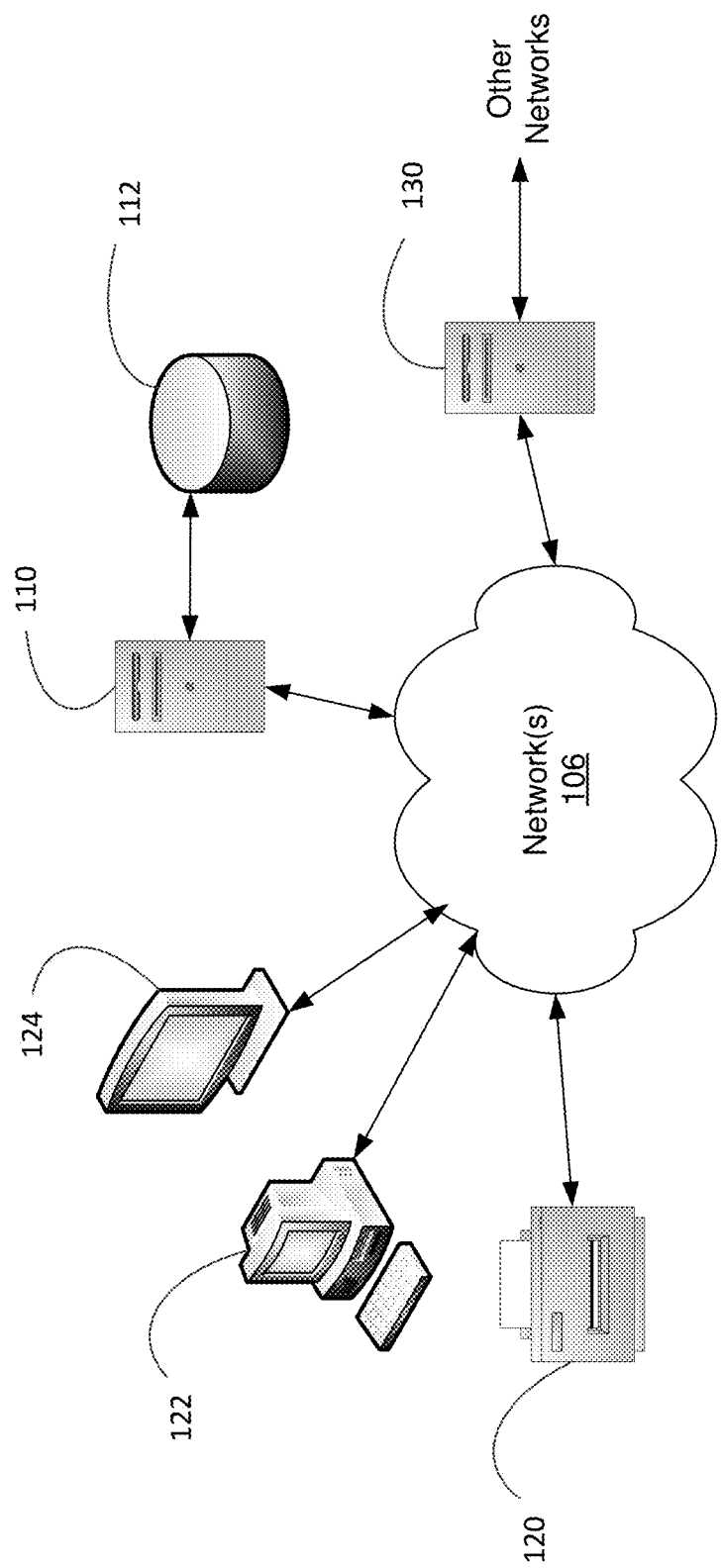
FIG. 1 is a schematic diagram depicting an example of a computer network based system that may be subject to attack and may be suitable for utilization of certain aspects of the present invention.

FIG. 1 is an architecture diagram that depicts aspects of an example of a computer network system with communication among multiple devices. In this example, network 106, which can be one network or multiple networks, provides communication between server 110 connected to database 112 and several client devices, such as printer 120, personal computer 122, and interactive terminal 124. The architecture of FIG. 1 is a simplified representation of an enterprise environment having a multitude of different computing devices that may represent a target for an attack. A gateway 130 provides a communications link between the network 106 and other networks, such as the internet, through which an attacker may launch an attack.

Many instruction set architectures, including x86, have variable-length instructions. The function of an instruction in a variable-length instruction set depends to varying degrees on an entire instruction. The function of an instruction can be significantly changed by removing one or more bytes from the beginning of the instruction. This is particularly true in cases where an instruction contains a mandatory prefix byte that is an escape byte or in cases where a prefix is used to modify the length of a parameter to the instruction, among others. It is also likely that changing the initial offset will change the function of subsequent instructions because each subsequent instruction begins immediately following the last byte of the preceding one.

It is occasionally possible for an attacker to branch execution to offsets in the middle of an instruction, resulting in modified behavior. This serves two functions: obfuscation of the function of an attack payload and the ability to transform the function of existing bytecode. Legitimate programs typically follow their own blockgraph and rarely split instructions. An example of an exception is LOCK prefix splitting in x86 architectures. Instruction splitting is, therefore, a strong indicator of malicious code execution. The correct alignment of an instruction can be determined by parsing the section of bytecode in which it falls by starting from a known-good offset. Exported symbols and a program's entry point are examples of known-good offsets. Each subsequent offset at which a new instruction starts can then also be considered to be a known-good offset. Branches to offsets other than known-good offsets are not part of normal program operation and are highly likely to be the result of exploitation of software vulnerabilities provided that the unaligned offsets do, in fact, produce a series of executable instructions with a different function.

Additionally, because the instructions in most microarchitectures are considerably more basic than the logical components of a programmer's intentions, merely removing the initial part of a programmer's function and rearranging the order of execution without splitting instructions (or in a fixed-instruction-width microarchitecture) is also able to substantially change the function of a program. Accordingly, for the purposes of detecting, for example, malicious branch-oriented programming (BOP) code, such as jump-oriented programming (JOP) or return-oriented programming (ROP), branches to offsets in code blocks that would not normally be branched to in the course of program execution, e.g. branches to the middle of a program rather than an entry point, may be treated the same way as branches to the middle of instructions, i.e. instruction splitting.

Microcomputer code consists of an arbitrary long stream of bytes. In many microcomputer architectures, such as x86, the stream controls its own semantics in-band. When combined with variable-length instructions as also exist in x86, the meaning of the stream is entirely different if the beginning of the first byte is offset by some number of bytes (this offset is termed alignment). Since each instruction modifies state that can modify the operation of subsequent instructions, it is important that the stream have the correct context. That is, if the stream is taken from arbitrary data on disk it is important that the beginning offset not only be faithful to the intended alignment, but index the instruction intended to begin the programmatic sequence.

Certain aspects of the present invention involve a method for dynamic code analysis that mitigates context dependencies by emulating a payload or a segment or segments of code from a payload from different offsets in order to detect the emergent functionality of unaligned microcomputer code. One example of a method for dynamic code analysis in accordance with certain aspects of the present invention involves iteratively emulating a corpus of data over multiple starting addresses using code offsets that are different from a normal code alignment and testing for functionality of the code, e.g. validity, executability or specific operations, as executed from the different code offsets. In other words, this approach involves iterating over several offsets in an instruction stream or data being evaluated as to whether it is an instruction stream that possibly exhibits certain behaviors to find an offset, aligned or otherwise, from which execution of the stream will produce certain specified behaviors. Emulation of the code in this manner may obviate the need for construction of an accurate control flow graph of the code stream in order to analyze the code. This approach may also be useful for identification of alternate meanings of an instruction stream at different alignments, as discovered through iteration over several alignments, or to analyze the nature of code that, possibly due to an error or inherent uncertainty in software vulnerability exploitation, is unreachable from the program being executed in a given memory image. Another aspect of certain embodiments is the computation of the set of addresses that are to be iteratively emulated with different offsets. The results or parameters of this computation may be shared across multiple nodes to permit distributed analysis.

Figure 2:
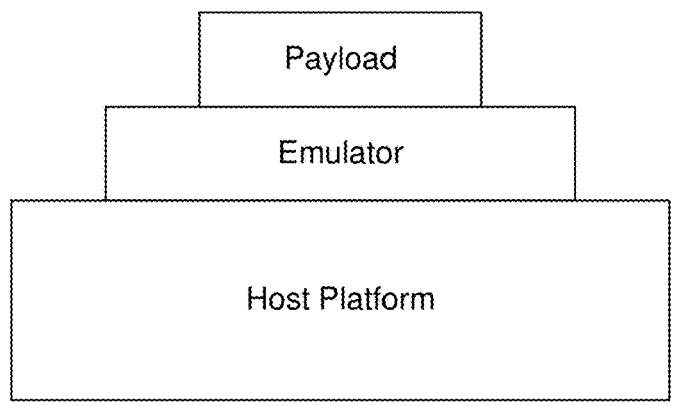
FIG. 2 is a functional block diagram illustrating a simplified example of the structure of conventional emulation.
Figure 3:
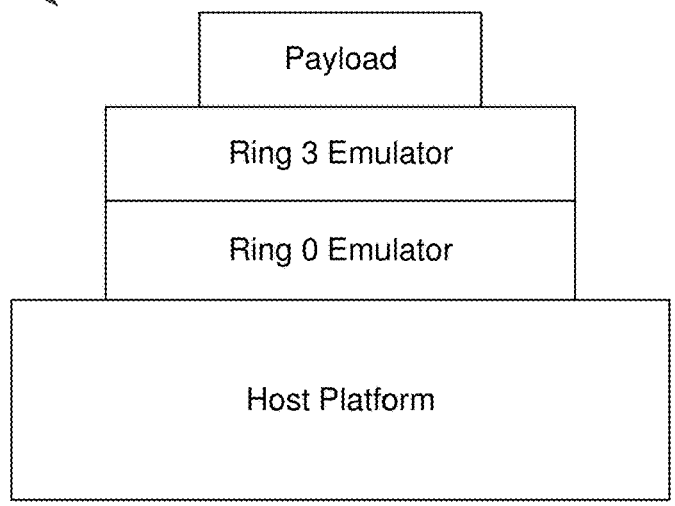
FIG. 3 is a functional block diagram illustrating a simplified example of the structure of emulation in accordance with certain aspects of the present invention.

FIG. 2 is a functional block diagram illustrating a simplified example of the structure of emulation, wherein an emulator program runs on a host platform and payload code runs on the emulator program, which emulates the payload functionality and relies on the host platform to provide basic functionality. For example, the emulator may provide Ring 3 emulation to the payload while Ring 0 responses are provided to the emulator from the host platform or a separate Ring 0 emulator rather than the host platform. FIG. 3 is a functional block diagram illustrating an example of separate Ring 3 and Ring 0 emulation. The payload interacts with the Ring 3 emulator as if it's a normal Ring 3 shell. Because Ring 0 functionality is separately emulated, the payload may be allowed to execute freely in order to observe its behavior without risk to the host platform and it is more difficult for the payload to detect that it's running in an emulated environment.

An emulator is software, hardware or a combination of both that emulates or imitates another program or device. For example, an emulator program may enable a host operating system, e.g. the Mac OS, to emulate another operating system, e.g. Windows, and thereby permit application programs written for emulated platform to execute on the host platform. The emulator duplicates the functions of the emulated platform on the host platform to present a virtual machine that exhibits the behavior of the emulated platform. To an application program, the virtual machine executing on the host platform appears as the emulated platform. The emulator allows the user to have access to any kind of application or operating system on a current platform, while the software runs as it did in its original environment. Many emulators emulate Ring 0 code to enable other programs, such as applications, to operate. Other emulators mimic a microarchitecture.

One example of emulation in accordance with certain aspects of the present invention is running executable code in a way that allows it to make use of operating system functionality to a limited extent without any operating system code being emulated in the same context as the code under emulation, based upon a directory of the behavior of the operating system under emulation, without effecting the intent of the operating system functionality. In essence, the code under emulation is unable to accomplish its intended purpose while still being able to execute, by emulating certain operating system and microarchitecture functionality in such a way that it returns the expected results to the code under emulation, but does not actually perform the task it would be expected to perform outside the emulator.

In certain embodiments of a method for dynamic analysis in accordance with certain aspects of the present invention, the method involves emulating execution of a payload or segments of code in a payload from multiple code alignments (there are 4 possible alignments in 32-bit systems and 8 in 64-bit systems) for sequences that appear to be functional.

FIG. 3 is a control flow diagram illustrating an example of a process 300 for iterative emulation of microcode for dynamic analysis in accordance with certain aspects of the present invention. In this example, emulated execution of a payload or portions of a payload is performed at different offsets or alignments. At step 302, the first instruction alignment is determined and the payload is executed by an emulator beginning at the entry point of the payload or a sequence of instructions with the payload.

In one example, emulating the payload includes emulating the payload based on each possible instruction alignment on a fixed-instruction-length architecture corresponding to the code in the suspected payload. For example, if the architecture instruction length is 4 bytes, each of the instruction offset, the instruction offset plus one, the instruction offset plus two, and the instruction offset plus three would be used as starting offsets for each iteration of emulation of the payload. Similarly, if it is two bytes, the instruction offset and the instruction offset plus one will be used for starting offsets. If the architecture uses 24-bit (3 byte) instructions and 32-bit (4 byte) data words, the +0, +1, and +2 alignments would be used in emulation.

Another example involves emulating the contents of a memory image and includes emulating linear execution of an instruction stream deemed to begin at each address present in the memory image. For example, for a memory image containing 65536 committed bytes, 65536 invocations of an analytic emulator are run, one starting from each successive address, in order to find whether one or more such addresses begins a program that appears to the analytic emulator to exhibit malicious behavior.

The emulation may also be performed on fixed or sliding windows of addresses within the payload, which reflects the characteristic of many malicious payloads, such as BOP exploits, to consist of small segments of functional code. The window size may, for example, be predetermined or adjusted and reflects the characteristic of malicious code to be small, e.g. the characteristic of JOP exploits that the jump table is usually small (i.e. the elements of the jump table forming the JOP program are co-proximal) and, similarly, that a ROP chain is relatively small and closely packed.

One example of emulation in accordance with certain aspects of the present invention emulates both the microarchitecture and the Ring 3 code, while maintaining a separation between them. The emulator implements the Ring 0 code, e.g. returning appropriate behavior for the Ring 3 code under emulation, and separately emulates the Ring 3 code, providing for a microarchitecture or processor mode different from that on which the emulator is running, e.g. x86 IA-32e compatibility mode on an Intel 64 processor running in 64-bit mode. Because of this, the emulator is able to conduct dynamic analysis on the running code and report on its behavior as opposed to simply allowing the code under emulation to perform the purpose for which it was intended. Certain examples adapt the emulation process to analysis of crashes resulting from attempts to inject malicious payloads into software. Other examples adapt the emulation process to find malicious payloads in arbitrary data or apply instrumentation to an already isolated payload to permit the payload to be studied.

Another example in accordance with the present invention involves running the code from a variety of different offsets, for example, each address residing in a read/write page of memory, which is a page type that is more likely to contain malicious payloads than other page types. While few of these offsets would make an effective entry point for a program, and, in fact, none of them may be the canonical entry point, it is likely that if a malicious payload exists, one of the offsets will be its starting address, which will trigger execution of the malicious payload so that its behavior may be detected and analyzed. In essence, this example involves emulating parts of a process image that are likely to be useful to attackers, rather than those parts which are likely to be code, without reference to the entry points in the code for the process. In effect, this example combines an iterative linear search with an instruction limit to analyze a large number of offsets to detect which offsets are likely to be valid entry points for malicious code, of which there may be many in an exploit payload.

In another example in accordance with the present invention, emulation is started from a later offset than the program entry in order to bypass anti-emulator loops embedded in malicious payloads. In still another example, an instruction count limit is utilized in the emulator to ensure that analysis will, at some point, complete without a need to solve the halting problem. In yet another example, the emulated code includes either literal code or sequences of pointers to literal code that are emulated in such a way that control is transferred to code at each pointer either in succession or in some defined order (e.g. ROP chains or JOP tables).

Certain embodiments of the present invention are able to detect malicious payloads that were not successfully executed despite being successfully introduced into process memory. In order to exploit arbitrary code execution vulnerabilities in software, an attacker first introduces the payload into process memory, and then "hijacks" or takes control of the instruction pointer such that it points to the beginning of the payload. Introducing the payload is less likely to fail than taking control of the instruction pointer since many programs are designed to load arbitrary data into memory. The control step will fail for such reasons as the wrong offset being jumped to, or a protection against this operation which exists in the program being exploited. If this happens, the malicious payload is not reachable through the normal program block graph from the original execution entry point and certain embodiments of the present invention emulate from other offsets to find the payload.

An aspect of certain embodiments of the present invention involves executing arbitrary code in an emulator that detects and reports on certain behavior, such as malicious code-like activity, including the invocation of certain operating system behavior, the execution of certain instructions or sequences of instructions, and accesses to certain memory addresses, all of which may be defined dynamically, parametrically, or statically. In one example, the emulation keeps the code under emulation executing as long as reasonable from each offset, while implementing any self-contained functionality in the code, e.g. decrypting or self-mutating operations, without completely executing it. Instrumentation is then used to check for behavior that is valid yet unlikely to be found in legitimate code, such as sequences of instructions whose effect is to load the value of the instruction pointer into a general purpose register or to detect whether the code is running in an emulator.

One aspect of certain embodiments of the present invention is detecting the intended invocation of undefined processor behavior and reporting on its occurrence. Some embodiments of the present invention have properties similar to a signature-based malicious code detection engine, except that these embodiments are able to use a discrete set of signatures, which are lists of behaviors rather than of sequences, and remove the need to pre-compute the results of the malicious code's decoders. Rather, the decoder present in the malicious code is itself used, if one exists, so that it is not necessary to recognize them or keep an updated list. In other words, instead of trying to merely match malicious code behavior, certain embodiments detect that malicious actions were attempted directly. Certain components of the execution environment, such as userland parts of exception handling, can be executed in this way to also improve detection.

Because the malicious code is not running in a real environment, sandboxing may not be needed. System calls are emulated, but their effect on the system is not. Therefore the malicious code running within the emulator is unable to communicate with other systems or processes, and the malicious code doesn't achieve persistence, unless there is a vulnerability in the emulator implementation that would allow control to be taken of the host system, which is the same risk as in any other application. The emulation of the present invention does not represent an elevated risk of compromise even though it concentrates malicious data.

Note that the malicious code is unlikely to be entirely executed. It is inferred that malicious code was injected into the process under analysis and that an attempt was made to branch execution in a suspicious way. The mechanisms of persistence of the exploit and the intention of the exploit are not necessarily analyzed. Generally, it is the techniques used in the initial part of the payload, which gains control of execution and starts the components that conduct malicious computation or achieve persistence, that are analyzed. However, once the presence and location of malicious code are confirmed through certain embodiments of the present invention, other tools may be used to analyze the exact end-to-end effects without emulation.

Figure 4:
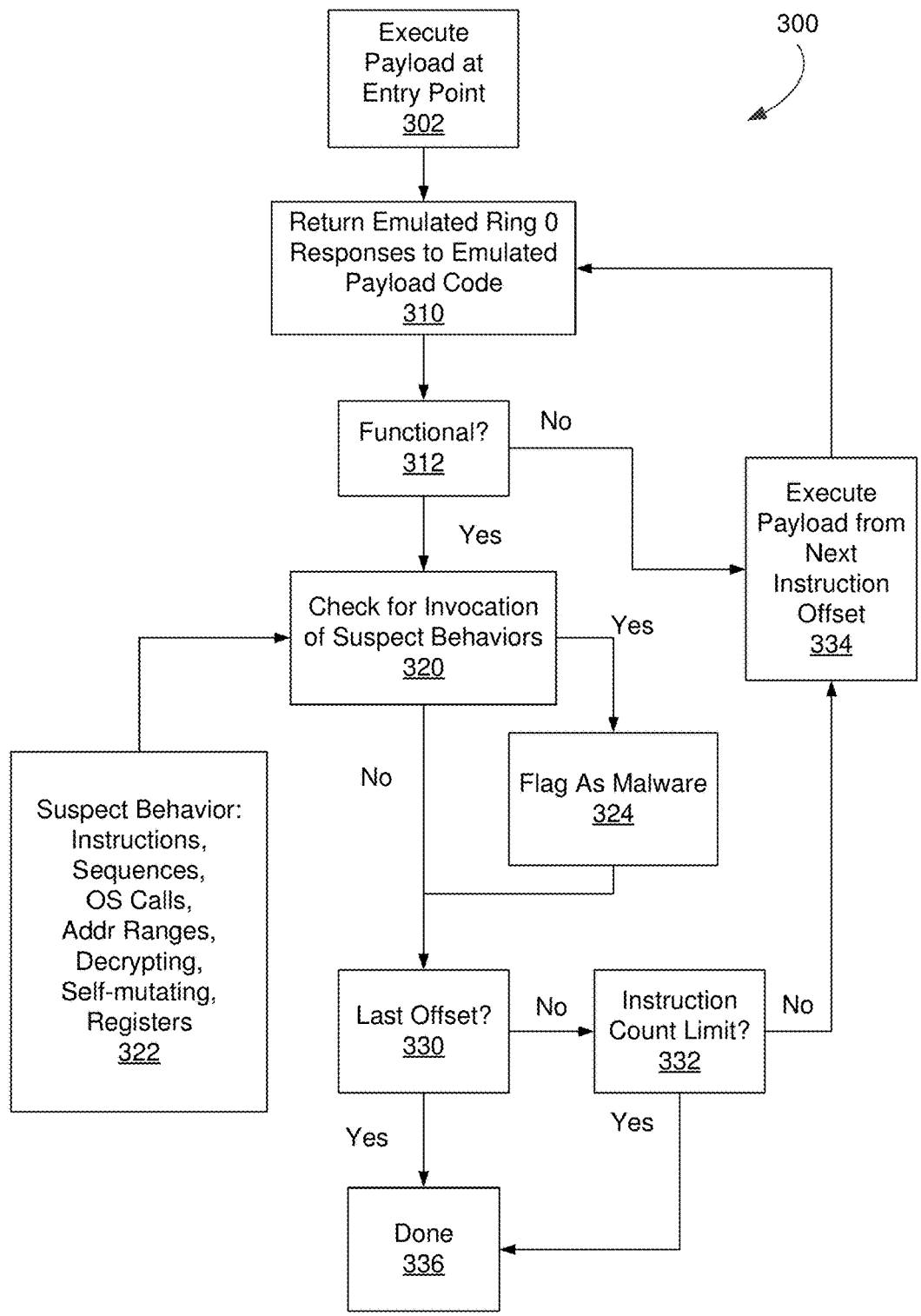
FIG. 4 is a control flow diagram illustrating an example of an emulation process in accordance with some aspects of the present invention.

FIG. 4 is a control flow diagram illustrating an example of an emulation process 300 for in accordance with certain aspects of the present invention. In this example, at step 302, the payload code or a segment of the payload code is executed in a Ring 3 emulator starting at a normal entry point for the payload code. At step 310, calls to Ring 0 functionality from Ring 3 cause the Ring 0 functionality to be emulated and the emulated response returned to Ring 3. In this manner, Ring 0 and Ring 3 functionality is emulated separately. This may involve emulating certain operating system and microarchitecture functionality in such a way that the Ring 0 emulation returns the expected results to the payload code or segment under emulation, but does not actually perform the task it would be expected to perform outside the emulator in the host platform. Emulation of events that are dependent upon unknown or unknowable circumstances, e.g. reads from disk or device drivers where context is unavailable or a capture of that context is unimplemented, may be simulated by providing random or static data, though at a cost to the accuracy and completeness of the emulation.

At step 312, the emulated code is checked to determine whether it is functional, e.g. whether the code at the current offset is a valid instruction that is executable. For example, the current offset of the emulated code may result in an invalid instruction, in which case the code as emulated at the current offset is non-functional and control flow branches to step 334 for determination and execution of the payload or segment from the next instruction offset. If the code is executable, then control flows to step 320 to check the function of the code.

At step 320, the behavior of the payload code or segment as it is executed at the current offset in Ring 3 emulation is examined for suspect behavior associated with malicious code. The suspect behavior may be defined dynamically, parametrically, or statically by, for example, a detection engine at step 322. Suspect behavior includes, for example, invocation of certain operating system behavior, execution of certain instructions or sequences of instructions, and accesses to certain memory addresses, self-contained functionality in the code, e.g. decrypting or self-mutating operations, sequences of instructions whose effect is to load the value of the instruction pointer into a general purpose register or to detect whether the code is running in an emulator. The detection engine may also use a discrete set of signatures, which are lists of behaviors rather than of sequences and may be checked, for example, initially and when self-modifying code is found to mutate. Further, the engine may detect when the instruction pointer has moved into a range of addresses that is suspicious, such as ranges not normally executed in the vulnerable programs blockgraph. This range may be configured, precomputed, or a combination of configured and computed. The range of suspect addresses may include addresses that should never be executed, such as the program stack, and addresses that are known to be typically used in malicious code, e.g. 0x41414141. Other external heuristics may be applied to determine the set of suspicious address ranges.

If suspect behavior is detected at step 320, then the payload code is flagged as potential malicious code at step 324. Step 324 may include providing data on the behavior of the executed malicious payload, such as address of the code, the type of behavior detected, and dynamically generated process data. In this embodiment, control branches to step 330 for further emulation. Alternative embodiments may terminate emulation once the malicious code is detected.

At step 330, a check is performed to determine whether additional instruction offsets exist that may be emulated and control flows to step 334 to execute the payload code from the next offset and branch to step 310 for continued emulation. In this example, the emulation process runs the payload code or a window or segment of code from a variety of different offsets without reference to the entry points in the code for the process, such as each address residing in a read/write page of memory to attempt to trigger execution of malicious code within the payload so that its behavior may be detected and analyzed. For example, a set of malicious code that is preceded by a branch instruction that branches past the malicious code may keep the malicious code hidden. Emulating from each address in read/write memory will eventually begin executing at the beginning of the malicious code, which will trigger execution of the code.

If no additional offsets are to be run, then emulation terminates at step 336. If there are additional offsets, but the number of executed instructions from the payload has reached an instruction count limit, then emulation also terminates in order to avoid the halting problem. Note that the process 300 may be applied to a segment of the payload code with all of the possible offsets being emulated for the segment. The process 300 may also be applied to a sliding window of payload code that checks for functional code at all of the possible offsets of instructions in a window that increments through the payload.

Figure 5:
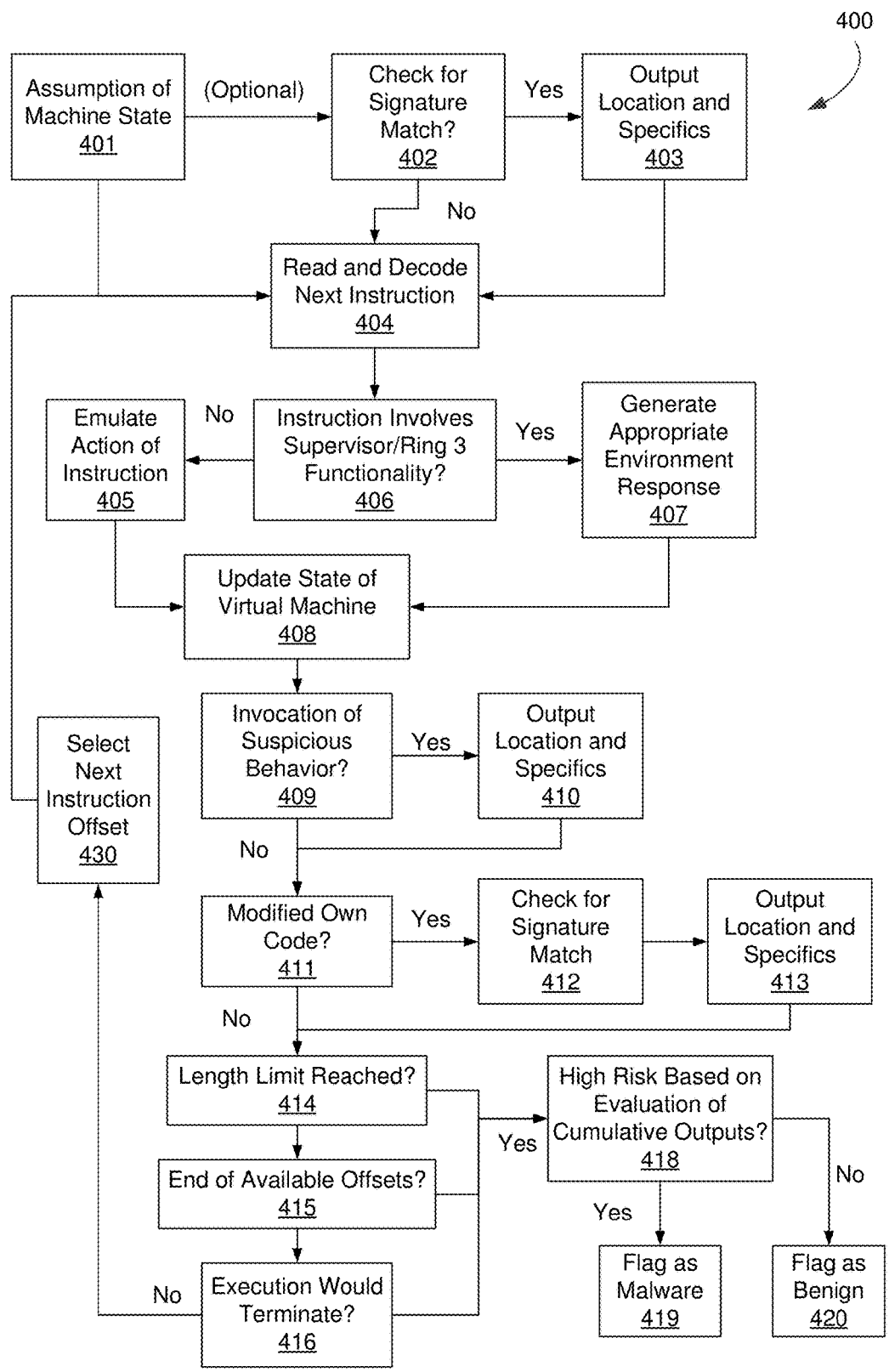
FIG. 5 is a control flow diagram illustrating another example of an emulation process in accordance with some aspects of the present invention.

FIG. 5 is a control flow diagram illustrating another example of a dynamic analysis process 400 based on emulation in accordance with certain aspects of the present invention. The process may be applied to a payload, a segment of a payload, or a sliding window of the payload code and emulates execution of the code at each possible offset for the microarchitecture. In this example, emulation begins at step 401 with the assumption of machine state, typically acquired from a snapshot of machine state present in a failure artifact or like form. Machine state generally includes at least working registers (i.e. on x86, EAX, ECX, EBX, EDX, ESP, ESI, EDI, EBP, and possibly others including coprocessor and debug registers, but not necessarily system management registers) and memory state. State which is not present may be assumed by other means including random generation and initialization to constant values. Accuracy is improved through the use of accurate state. A value for the instruction pointer is also assumed, though this value is typically not derived from the snapshot of state, but rather is set according to an emulation plan. Optionally, method 400 may include step 402, where the entirety of the memory image is checked against a signature database for the presence of sequence-matchable malicious code. If any malicious code signature match is found, then, step 403 reports one or more signatures that matched and may include the identity of the signature and the offset at which the match began.

From step 401, or optionally steps 402 and 403, process 400 continues by reading and decoding the instruction at the offset of the virtual instruction pointer (step 404). Step 404 also increments the count of executed instructions by one. The instruction and its operands are interpreted and whether the instruction is valid or not, the semantics and identity of the instruction, and the constraints on its operands are identified. Operands from the environment (i.e. memory operands) are checked as to validity and loaded if valid. If the instruction is not valid in the context in which it appears (e.g. privileged instruction in non-privileged code, invalid instruction, invalid operands, etc.), the resultant exception is handled in the way the system being emulated is known to handle it, possibly relying upon gathered state where this affects the handling in a manner similar to step 407. Execution may immediately terminate or may be branched to some location in the code, such as 417 or 408.

In the event that instruction decoding was successful at step 404, control flows to step 406 for a determination of whether the instruction would invoke supervisor or ring 0-2 behaviors (including exception handlers, system calls, interrupts, etc.), or not. If it would, control branches to step 407 to generate an appropriate response for the current environment for the emulated virtual machine, e.g. by looking up or computing the appropriate response and change in state for the given environment under emulation. If not, control branches to step 405 to emulate the action of the instruction by, for example, directly computing the effect of the instruction upon the state.

In either case, the state of the virtual machine is updated at step 408, committing register and memory updates, environment updates, and incrementing the instruction pointer to the next instruction. If the instruction branched execution (not pictured but basically a sub-step of 308), the instruction pointer is updated to the branch destination address.

Control branches from step 408 to a series of checks as to whether malicious activity is occurring are performed. Step 409 checks whether the instruction matched a defined pattern of behavior that is more likely to be part of attack code than legitimate code. Examples of such behavior include loading the current value of the instruction pointer into a register, branching execution to the stack or the heap or some other restricted range derived by external means, or executing instructions with the apparent purpose of detecting the presence of a virtualization environment, such as by checking undefined or commonly erroneously implemented behaviors or by using documented means to make that determination. If such is found at step 409, control branches to step 410 to output the location and specifics the suspicious behavior, e.g. identify the type of behavior and the address at which it occurred. In either case, control flows to step 411 to check whether the instruction modified its own code. If it has, then control flows to step 412 and then 413, if the signature-matching associated with step 402 is being used, to check the signature database again or, if the signature matching option is not employed, directly to step 413, to report the location and specifics for the self-modifying instruction, such as the location of the self-modifying code, and the code which modified it, as well as any matched signatures from step 412. Step 412 is substantially similar to step 402 and step 403 and is effectively a combination of these two steps in the event that the signature-checking approach is employed. Both steps 410 and 413, upon finding something to report, increment or multiply the maximum instructions to execute by a configurable amount or factor.

Whether or not the code was self-modifying (i.e. continuing from step 411 or 413), the number of instructions executed (as recorded in step 404) is compared against an arbitrary maximum length limit (specified, and modified by steps 410 and 413 or in a refinement) is checked at step 414. If this limit is reached, emulation proceeds no further and control branches to step 418. If it is not, then control branches to step 415 for a determination of whether the offset at which the instruction pointer now points is populated with additional instructions from the state snapshot. If emulation has reached the end of available offsets, control branches to step 418. If there are more available offsets, control branches to step 416 for a determination of whether the result of the last-executed instruction is termination. If emulation would terminate, then control branches to step 418. Otherwise, control branches from step 416 to step 430 determine the next offset and continue emulation at step 404 to read, decode and execute the next instruction using the new offset.

In this example, once emulation has stopped proceeding, control flows to step 418 where the cumulative risk factor is evaluated against an arbitrary threshold. The risk factor, in this example, is an additive factor composed of unique identified elements of attack code multiplied by weights. If the risk factor threshold is exceeded, then, in addition to outputting the identified risks, the process proceeds to step 419 to report that there is malicious code in the sample. If the threshold is not exceeded, the process flows to step 420 to report the identified risks and indicate that the code sample is not likely to include malicious code.

Process 400 may be refined to look for what appears to be iteration over some block of memory by a decoder, by inventorying the addresses updated by the code under emulation and sorting them, and then, when the instruction limit is hit, extending it by the length of that iteration plus some factor.

Malicious code may be anywhere in the process image. Certain embodiments of the present invention may be adapted to detect return-oriented programming (ROP). In one approach, ROP is detected by deeming some arbitrary part of memory to be the stack (setting the stack pointer accordingly), and kicking off execution by executing a return instruction (predicated upon that stack) instead of starting execution at any specified offset. The effect of this is that if the deemed stack is actually a ROP stack, then the ROP payload will be "executed", which cannot be achieved if the stack pointer is held invariant.

Figure 6:
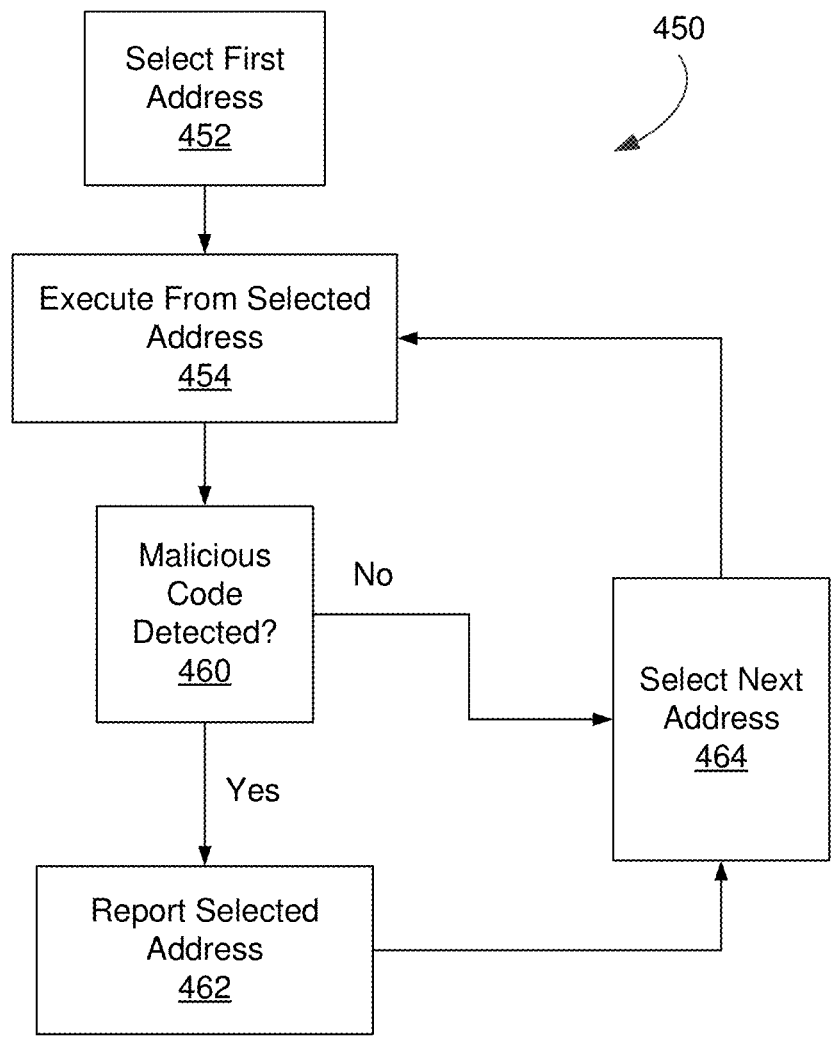
FIG. 6 is a control flow diagram illustrating another example of an emulation process in accordance with some aspects of the present invention.

The present invention is not limited to emulating particular privilege levels of operating system, but may be applied to any suspect corpus of data on a variety of platforms and microarchitectures. FIG. 6 is a control flow diagram illustrating an example of a linear search process 450 that may be utilized in some embodiments in accordance with certain aspects of the present invention. A first address of a corpus of data to be evaluated is selected at step 452. Execution is initiated from the selected address using a given set of state at step 454. At step 460, a check is made to determine whether the code execution at step 454 elicited suspicious behavior from the executed code. If the behavior is suspicious, the selected address is reported at step 462 as a likely entry point for a malicious code segment and control proceeds to step 464 to continue emulation at the next address. If no suspicious behavior is detected at step 460, then control branches to step 464 to select the next address for execution. In this example, the corpus of data under analysis is linearly searched in order to identify the malicious code entry points in the corpus of which there may be many.

Figure 7:
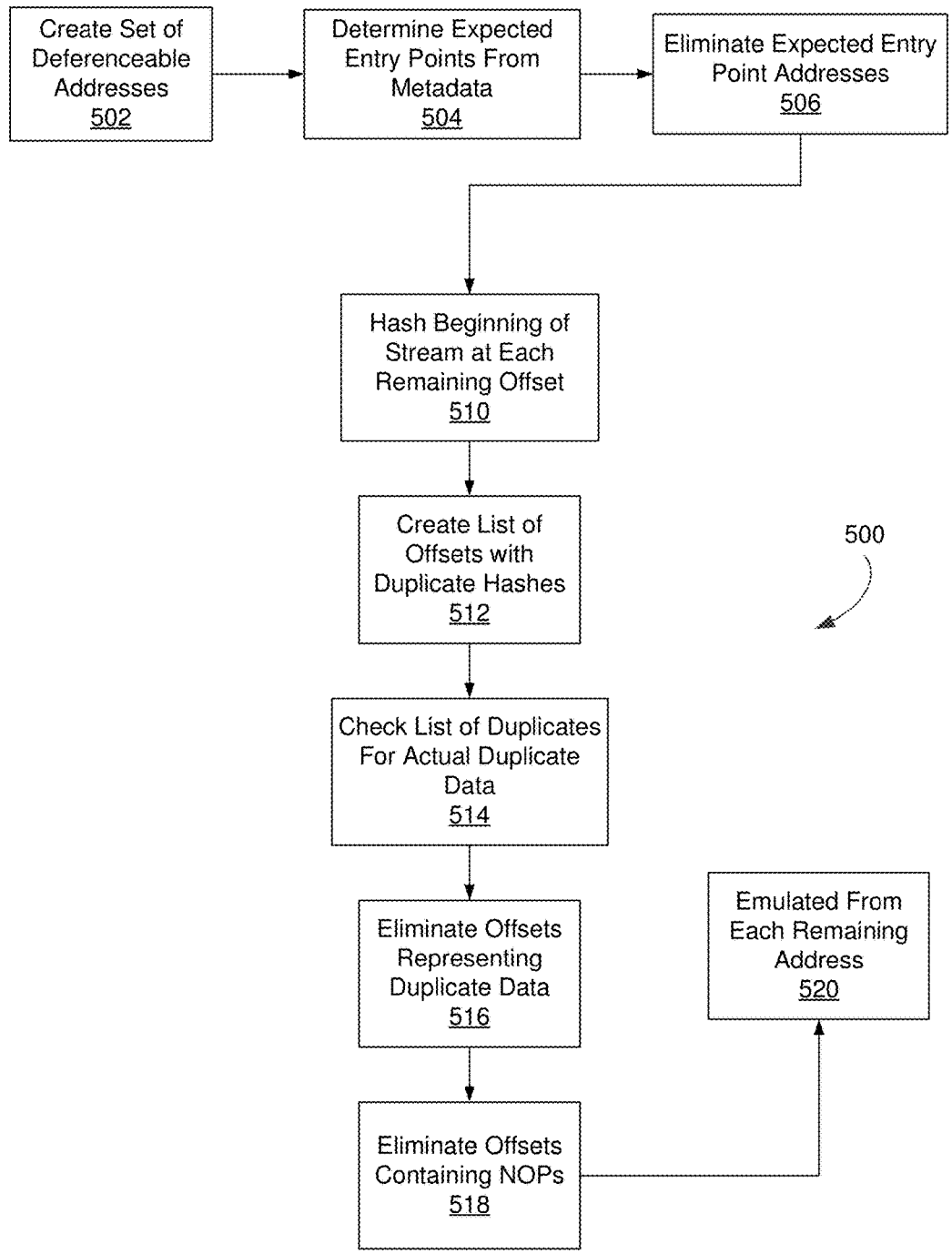
FIG. 7 is a control flow diagram illustrating another example of an emulation process in accordance with some aspects of the present invention.

FIG. 7 is a control flow diagram illustrating an example of a process 500 for reducing an emulation plan in accordance with certain aspects of the present invention. At step 502, a set of dereferenceable addresses is created from a corpus of data under analysis. At step 504, the expected entry points for the corpus of data are determined and, at step 506, these expected or normal entry points are removed from the set and, therefore, from further analysis. At step 510, a hash is performed at the beginning of the stream for each offset remaining in the set of addresses. At step 512, a list of offsets with duplicate hashes is created and, at step 514, the list of duplicate hashes is checked to verify that the corresponding code or data is actually duplicated and, if so, the duplicate offsets are eliminated from the set at step 516. At step 518, offsets in the corpus of data that contain no operation (NOP) codes are removed from the set of addresses. At step 520, analytic emulation is performed on the remaining offsets in the set of addresses. This process typically allows the number of emulation iterations to be reduced.

In accordance with at least one embodiment of the invention, the system, apparatus, methods, processes and/or operations described herein may be wholly or partially implemented in the form of a set of instructions executed by one or more programmed computer processors, such as a central processing unit (CPU) or microprocessor. Such processors may be incorporated in an apparatus, server, client or other computing device operated by, or in communication with, other components of the system. In accordance with another embodiment of the invention, the system, apparatus, methods, processes and/or operations described herein may be wholly or partially implemented in the form of a set of processor executable instructions stored on persistent storage media.

Figure 8:
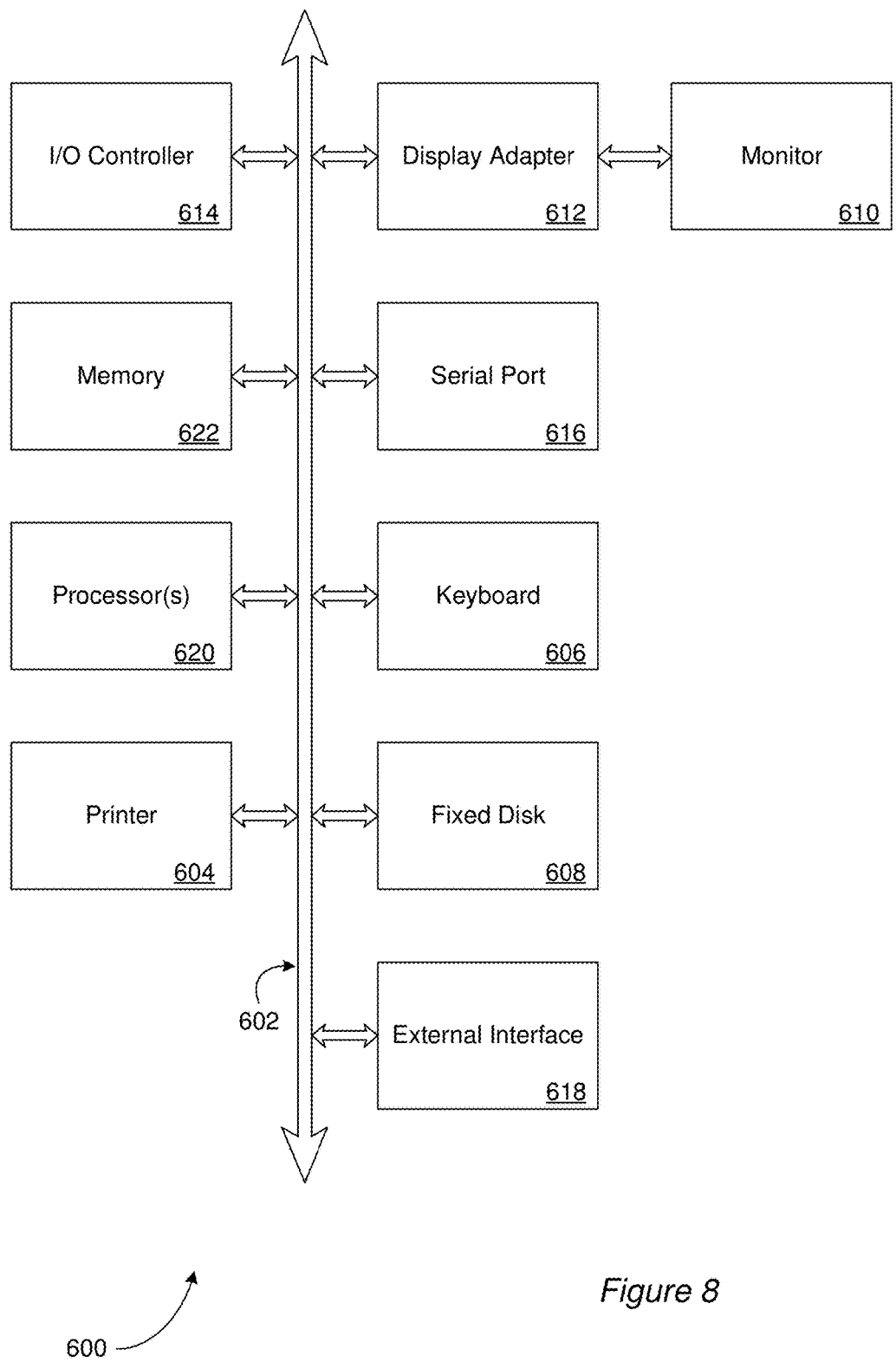
FIG. 8 depicts aspects of elements that may be present in a computer device and/or system configured to implement a method, system and/or process in accordance with some embodiments of the present invention.

FIG. 8 depicts aspects of elements that may be present in one example of a computer device and/or system 600 configured to implement at least some elements of a method, system and/or process in accordance with some embodiments of the present invention. The subsystems shown in FIG. 8 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl or using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM, where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components or steps depicted in the drawings or described above, as well as components and steps not shown or described, are possible without departing from the scope of the invention. Similarly, some features and subcombinations are useful and may be employed without reference to other features and subcombinations. Embodiments of the invention have been described for illustrative and not restrictive purposes, and alternative embodiments will be apparent to one of ordinary skill in the art. Accordingly, the present invention is not limited to the embodiments described above or depicted in the drawings, and various embodiments and modifications can be made without departing from the scope of the invention.

We claim:

1. A method for iteratively emulating potentially malicious code, the method comprising the steps of:
   for each offset of a microarchitecture for the code:
   emulating a first ring of an operating system;
   executing a segment of code in the emulated first ring;
   checking the behavior of the executing code for suspect behavior; and
   identifying the executing code as malicious code if suspect behavior is detected.

2. The method of claim 1, where the method further includes the step of emulating a second ring of the operating system, the second ring having a higher level of privilege than the first ring, such that the second ring emulation returns results to the executing code segment, but does not actually perform the functionality in a host platform.

3. The method of claim 2, where the step of emulating a second ring of the operating system further comprises the steps of:
   emulating the code payload in a virtual machine; and
   emulating operating system calls and interrupts in a separate layer that does not perform the operating system calls and interrupts, but returns an expected return value to the code payload in order to facilitate continued execution of the code payload.

4. The method of claim 1, where the step of executing a segment of code in the emulated first ring further includes determining the segment of code using a sliding window applied to a code payload.

5. The method of claim 1, where the step of checking the behavior of the executing code payload for suspect behavior further includes determining the suspect behavior one or more of dynamically, parametrically, and statically.

6. The method of claim 1, where the suspect behavior includes one or more of invocation of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

7. The method of claim 6, where at least some of the suspect behavior is defined by one or more of dynamically, parametrically, or statically.

8. A system for iteratively emulating potentially malicious code, the system comprising:
   one or more processors; and
   at least one non-transitory computer storage medium having computer executable instructions stored thereon which, when executed by the one or more processors, cause the one or more processors to:
    emulate a first ring of an operating system for each offset of a microarchitecture for the code;
    execute a segment of code in the emulated first ring;
    check the behavior of the executing code for suspect behavior; and
    identify the executing code as malicious code if suspect behavior is detected.

9. The system of claim 8, where the system further includes instructions that, which executed by the one or more processors, cause the processors to emulate a second ring of the operating system, the second ring having a higher level of privilege than the first ring, such that the second ring emulation returns results to the executing code segment, but does not actually perform the functionality in a host platform.

10. The system of claim 8, where the system includes instructions that cause the processors to execute a segment of code in the emulated first ring by determining the segment of code using a sliding window applied to a code payload.

11. The system of claim 8, where the system includes instructions that cause the processors to check the behavior of the executing code payload for suspect behavior further by determining the suspect behavior by one or more of dynamically, parametrically, and statically.

12. The system of claim 8, where the suspect behavior includes one or more of invocation of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

13. The system of claim 12, where at least some of the suspect behavior is defined by one or more of dynamically, parametrically, or statically.

14. A non-transitory computer readable medium storing computer code configured to a cause a processing device to operate to iteratively emulate potentially malicious code, the computer code including instructions that configure the processing device to:
    for each offset of a microarchitecture for the code:
        emulate a first ring of an operating system;
        execute a segment of code in the emulated first ring;
        check the behavior of the executing code for suspect behavior; and
        identify the executing code as malicious code if suspect behavior is detected.

15. The non-transitory computer readable medium of claim 14, where the computer code includes instructions that configure the processing device to emulate a second ring of the operating system, the second ring having a higher level of privilege than the first ring, such that the second ring emulation returns results to the executing code segment, but does not actually perform the functionality in a host platform.

16. The non-transitory computer readable medium of claim 15, where the instructions configured to cause the processing device to emulate a second ring of the operating system further comprise instructions that configure the processing device to:
    emulate the code payload in a virtual machine; and
    emulate operating system calls and interrupts in a separate layer that does not perform the operating system calls and interrupts, but returns an expected return value to the code payload in order to facilitate continued execution of the code payload.

17. The non-transitory computer readable medium of claim 14, where the instructions configured to cause the processing device to execute a segment of code in the emulated first ring further includes instructions that configure the processing device to determine the segment of code using a sliding window applied to a code payload.

18. The non-transitory computer readable medium of claim 14, where the instructions configured to cause the processing device to check the behavior of the executing code payload for suspect behavior further includes instructions that configure the processing device to determine the suspect behavior one or more of dynamically, parametrically, and statically.

19. The non-transitory computer readable medium of claim 14, where the suspect behavior includes one or more of invocation of certain operating system behavior, execution of predetermined instructions, execution of predetermined sequences of instructions, accesses to predetermined memory addresses, execution of self-contained functionality in the code, execution of a decrypting operation, execution of a self-mutating operation, execution of one or more instructions to load a value of an instruction pointer into a general purpose register, execution of instructions to detect whether the code payload is running in an emulator, and execution of code matching at least one of a set of signatures.

20. The non-transitory computer readable medium of claim 19, where at least some of the suspect behavior is defined by one or more of dynamically, parametrically, or statically.

* * * * *